No. 624,991. Patented May 16, 1899.
A. A. SUNNE & L. C. OLSON.
CUTTING OR SLICING MACHINE.
(Application filed Feb. 16, 1898.)
(No Model.)
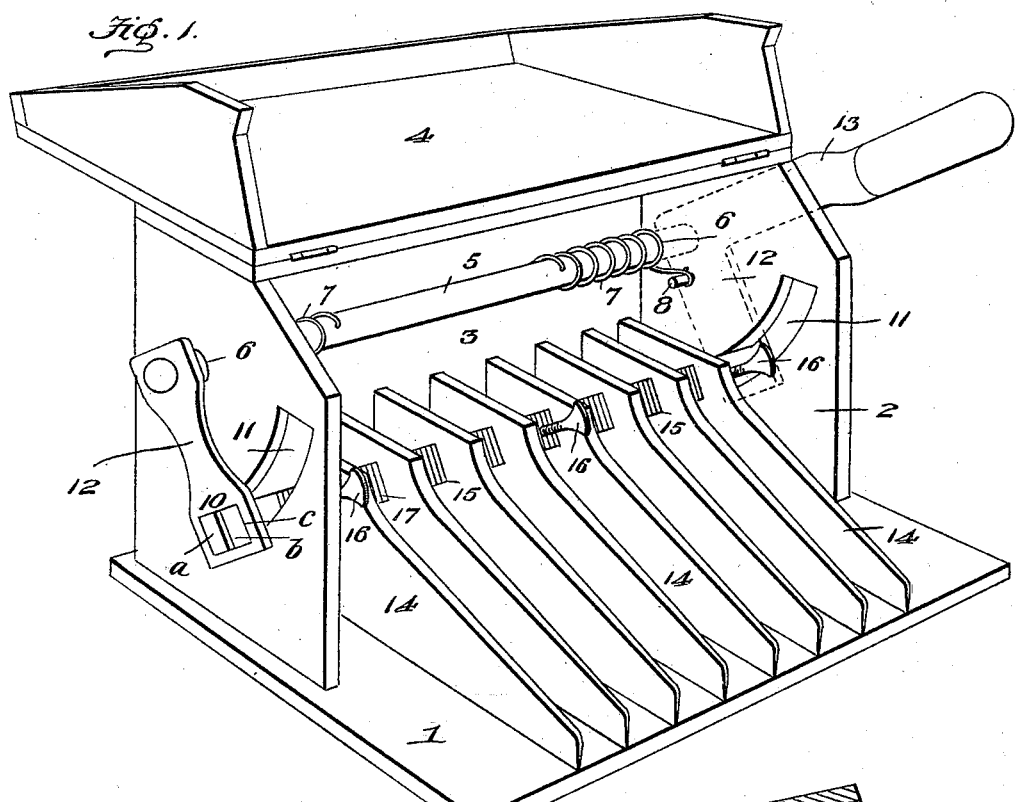
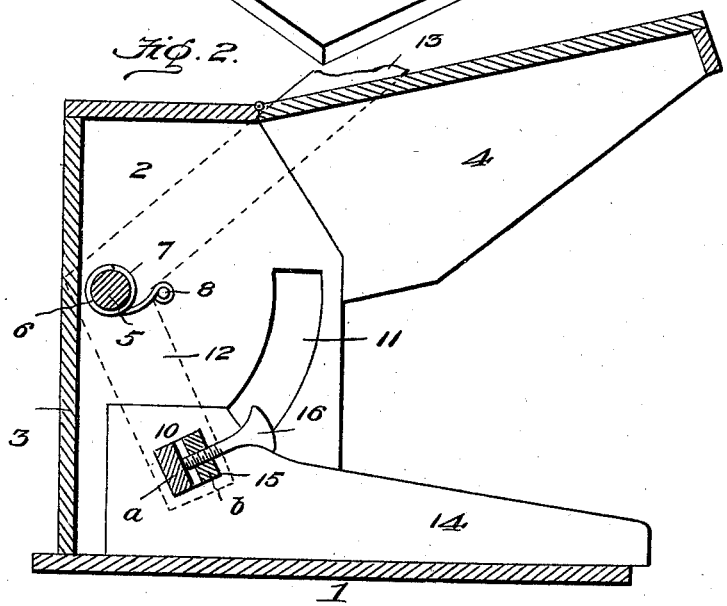
Witnesses
Inventors
Andrew A. Sunne
and L. C. Olson
by H. B. Willson & Co.
Attorneys
THE NORRIS PETERS CO., PHOTO-LITHO., WASHINGTON, D. C.

UNITED STATES PATENT OFFICE.

ANDREW A. SUNNE AND LOUIS C. OLSON, OF RHINELANDER, WISCONSIN.

CUTTING OR SLICING MACHINE.

SPECIFICATION forming part of Letters Patent No. 624,991, dated May 16, 1899.

Application filed February 16, 1898. Serial No. 670,550. (No model.)

*To all whom it may concern:*

Be it known that we, ANDREW A. SUNNE and LOUIS C. OLSON, citizens of the United States, residing at Rhinelander, in the county of Oneida and State of Wisconsin, have invented certain new and useful Improvements in Cutting and Slicing Machines; and we do declare the following to be a full, clear, and exact description of the invention, such as will enable others skilled in the art to which it appertains to make and use the same.

Our invention has relation to a cutting or slicing machine.

The object of the invention is to provide a machine of this character which may be used for the purpose of cutting bread, vegetables, fruit, &c., and may be adjusted to chop articles—such as vegetables, fruit, and meats—into small particles.

With this object in view the invention consists in certain features of construction and combination of parts, which will be hereinafter fully described and claimed.

In the accompanying drawings, Figure 1 is a perspective view of our improved machine, showing the hood thrown back in order to more fully illustrate the invention; and Fig. 2 is a longitudinal sectional view.

In said drawings, 1 denotes the base or chopping board; 2, the standards secured thereto; 3, the back; and 4 the hinged hood.

5 denotes a shaft journaled in bearings 6 in the standards and having coiled springs 7 wound about it and connected to studs 8, projecting from the standards.

10 denotes the cutter-bar, the ends of which project through segmental slots 11 in the standards and are connected by links 12 to the outer ends of the shaft. One of these links is formed with an operating-handle 13, by means of which the bar is rocked and the shaft rotated. The cutter-bar is formed of two longitudinal sections *a* and *b*, the ends of which project through square openings *c* in the free ends of the links.

Knives 14, having eyes 15, are mounted upon the cutter-bar and are firmly held in the desired adjustment, one with respect to the other, by spreading the bars apart, so as to make them firmly engage the walls of the eyes and bind the knives to the sections of the bar. The means shown for forcing the sections apart are set-screws 16, which pass through one section of the bar and engage the face of the other section. It is therefore evident that when the knives are adjusted and the set-screws worked inward to spread the sections of the bars apart said knives will be held in the desired adjustment with respect to each other. For convenience of gaging the knives we provide one of the sections of the bar with a scale 17.

In operation, if it is desired to slice an entire loaf of bread with one thrust the blades are adjusted corresponding to the thickness of the slice desired to be cut and the handle swung forward. The blades will pass through the loaf of bread with a drawing cut and will cut the slices smoothly and evenly of uniform thickness; or, if desired, the blades may be so adjusted that several thicknesses may be cut at the same time. In raising the blades the operator is assisted by the springs 7.

In chopping up meat or vegetables into fine particles the knives may be adjusted close together, and by reciprocating them and stirring the mass on the chopping board or base it is evident that it will soon be chopped finely.

From the foregoing description, taken in connection with the accompanying drawings, the construction and operation of the invention will be readily understood without requiring an extended explanation.

The machine will be found invaluable in the kitchen, as it may be used for many purposes other than those herein described, and, owing to its simplicity of construction, it may be placed on the market at small cost and will not be apt to get out of order.

Although we have specifically described the construction and relative arrangement of the several elements of our invention, we do not desire to be confined to the same, as such changes or modifications may be made as clearly fall within the scope of our invention without departing from the spirit thereof.

Having thus described our invention, what we claim, and desire to secure by Letters Patent, is—

1. In a machine of the character described, the combination with the cutter-bar consisting of two longitudinal sections, of blades having eyes through which said bar passes, and means for spreading the sections of said bar apart to bind the blades in their adjusted positions, substantially as set forth.

2. In a machine of the character described, the combination with the cutter-bar, consisting of two longitudinal sections, of blades having eyes through which the said bar passes, and set-screws for spreading the sections of said bar apart to bind the blades in their adjusted positions, substantially as set forth.

3. In a machine of the character described, the combination with the chopping-board, a standard uprising therefrom and provided with segmental slots, of a spring-actuated shaft journaled in said standard, a cutter-bar consisting of two sections, knives mounted upon said cutter-bar, means for spreading the sections apart for binding the knives in adjustment, links connecting the cutter-bar and the spring-actuated shaft, and an operating-handle connected with one of said links, substantially as set forth.

In testimony whereof we have hereunto set our hands in presence of two subscribing witnesses.

ANDREW A. SUNNE.
LOUIS C. OLSON.

Witnesses:
PAUL BROWNE,
D. R. THOMSON.